United States Patent [19]

Sandler

[11] 3,770,508

[45] Nov. 6, 1973

[54] CATHODIC ACTIVATION OF GAS DIFFUSION ELECTRODES

[75] Inventor: Yehuda L. Sandler, Pittsburgh, Pa.

[73] Assignee: Westinghouse Electric Corporation, Pittsburgh, Pa.

[22] Filed: Sept. 17, 1971

[21] Appl. No.: 181,591

Related U.S. Application Data

[63] Continuation-in-part of Ser. No. 2,285, Jan. 12, 1970, abandoned.

[52] U.S. Cl. .............................. 136/86 A, 136/86 R
[51] Int. Cl. .......................................... H01m 29/04
[58] Field of Search ........................ 136/86 A, 86 D

[56] References Cited
UNITED STATES PATENTS

3,395,046   7/1968   Levine et al. .......................... 136/86
3,494,797   2/1970   Duddy ................................. 136/86

*Primary Examiner*—A. B. Curtis
*Assistant Examiner*—H. A. Feeley
*Attorney*—F. Shapoe et al.

[57] ABSTRACT

A method of activating a gas diffusion electrode and operating a metal-gas cell containing an anode, a gas diffusion cathode having a gas fed into one side, and an electrolyte between the electrodes and permeating the other opposite side of the cathode, with a current flowing through a load circuit connecting the anode and cathode; by reducing the rate of gas flow to the gas diffusion cathode, at least once for at least about two minutes, to less than 5 cm$^3$/min for each cm$^2$ of exposed gas diffusion electrode area, so as to make the potential of the gas diffusion cathode more cathodic.

6 Claims, 3 Drawing Figures

WITNESSES

PATENTED NOV 6 1973          3,770,508

WITNESSES
Theodore T. Wrobel
Daniel P. Cillo

INVENTOR
Yehuda L. Sandler
BY Alex Mich
ATTORNEY

CATHODIC ACTIVATION OF GAS DIFFUSION ELECTRODES

CROSS-REFERENCE TO RELATED APPLICATIONS

This application is a continuation-in-part of copendng application Ser. No. 2,285, filed Jan. 12, 1970 now abandoned.

BACKGROUND OF THE INVENTION

This invention relates to hybrid metal-gas cells, and more particularly it pertains to a method of activating gas diffusion electrodes by applying a more negative cathodic potential to the electrode.

A gas diffusion electrode is used in hybrid batteries. In these, the diffusion electrode is generally fed with air oxygen and is generally paired with a metal electrode. In operation, the chemical energy of oxidation of the fuel or the metal is converted into electrical energy.

A common weakness of electrochemical cells operating with gas diffusion electrodes is the decline in output as the result of electrode poisoning. Either accumulated impurities or catalyst-poisons that are by-products of the electrochemical reaction that takes place in the electrode may be responsible. A gradual change in the mode of adsorption of the gas within the electrode may also be responsible for the decline in output of the cell.

The electrolyte reduction of oxygen to water in alkaline electrolyte proceeds by the scheme:

$$O_2 + 2H_2O + 4e^- \rightarrow 4OH^-.$$

At open circuit or when very small currents are drawn, the ideal oxygen electrode would be expected to give a potential of +0.30 volts as measured against a Hg/HgO reference electrode. Due to the irreversibility of the reaction, such high potentials cannot be achieved at ambient temperatures.

In practical cases the reaction is thought to proceed via the formation of hydrogen peroxide:

$$O_2 + 2H_2O + 2e^- \rightarrow H_2O_2 + 2OH^-;$$
$$H_2O_2 \rightarrow \tfrac{1}{2} O_2 + H_2O \text{ or}$$
$$H_2O_2 + 2e^- \rightarrow 2OH^-$$

It is thought that the catalysts, such as platinum, silver and palladium can be altered by the reduction reaction, and their ability to effect complete reduction of oxygen to water is impaired with consequent power loss.

Another weakness of electrochemical cells operating with gas diffusion electrodes is the relatively long period, sometimes several days, required to reach maximum activity. This is due to slowness of the penetration of the electrolyte into the pores of the gas diffusion electrode.

SUMMARY OF THE INVENTION

Briefly, the above problems are solved by reducing the potential of the gas diffusion electrodes i.e., making them more cathodic (negative), by reducing the gas supply at least once, but preferably periodically, for about 2 to 60 minutes at a low current density, to less than 5 cm³/min for each cm² of exposed gas diffusion electrode area.

It was found that such a process will activate the catalyzed gas diffusion electrode. It also will enhance the initial process of penetration of the electrolyte presumably due to a change in the wetting properties of the porous electrode body. It was found that the break-in-period of an electrode can be shortened from 1 to 3 days to about one-half hour or less.

Finally, the process for manufacturing gas diffusion electrodes may be shortened and simplified by my cathodic treatment. Metallic catalysts are often applied by impregnating the porous gas electrode with a water soluble salt of the catalytic metal. The salt is decomposed by heating and reduced to the metal in a flow of hydrogen. Applying a cathodic potential in situ makes the hydrogen treatment, and sometimes the heat treatment, superfluous.

BRIEF DESCRIPTION OF THE DRAWINGS

For a better understanding of the nature of this invention, reference will be made in the specification to the drawings, in which.

DESCRIPTION OF THE PREFERRED EMBODIMENTS

Figure 1:
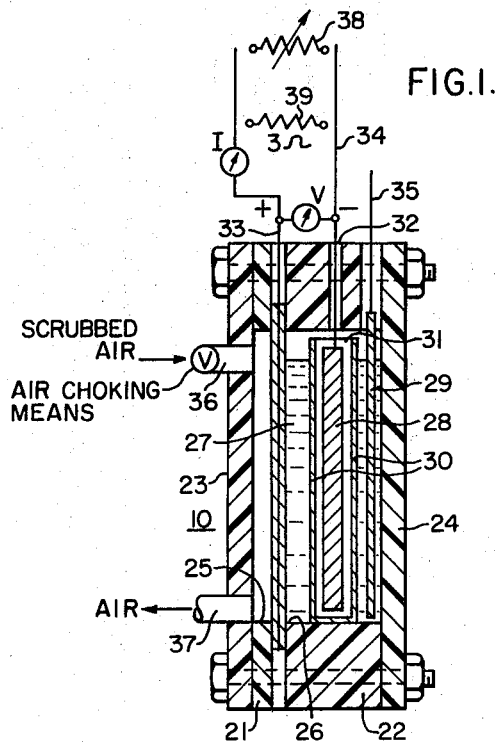
FIG. 1 is a schematic view showing a gas diffusion electrode mounted in a hybrid battery containing a metal electrode and an oxygen electrode, along with alternate electrical connections used in the Examples.

FIG. 1 shows an air electrode in a metal-air battery. The cathode gas diffusion electrode 10 is mounted between a pair of frame members 21 and 22 which are disposed between end plates 23 and 24. A gas chamber 25, is provided between the end plate 23 and the cathode diffusion electrode 10. Gas is supplied to the chamber 25 by an air pump, not shown, which has an air choking means to substantially reduce air or oxygen flow into the gas chamber.

A chamber 26 is also provided between the electrode 10 and the end plate 24, which chamber is filled with electrolyte 27 such as NaOH or a 30 weight percent solution of KOH. An anode, electrode 28, composed of an oxidizable metal such as iron, cadimum or zinc and a charging electrode 29 (for recharging the battery) are disposed in the chamber 26 and within the electrolyte. The electrode 28 is encased in a separator envelope 30 having an open top 31. Wire leads 33, 34 and 35 extend from the electrodes 10, 28 and 29 respectively. An air inlet 36 and an air outlet 37 are provided in the end plate 23. Also shown in variable resistive load 38 and resistor 39.

In accordance with the invention, electrolyte such as 30 weight percent aqueous KOH solution is added to the cell, air or oxygen is fed into the oxygen diffusion electrode (cathode) 10, where it ionizes at the catalytic layer within the oxygen electrode 10 forming hydroxyl ions ($OH^-$) which are transferred to the anode 28 where the electrons are freed by an oxidation reaction.

When air is used as the active gas it is preferably scrubbed before feeding it into chamber 25 by passing it through an alkaline solid absorbent or an alkaline absorbent solution such as aqueous sodium hydroxide, potassium hydroxide or monoethanol amine. This removes most of the carbon dioxide from the air which tends to form deposits in the electrode pores. Other impurities like $SO_2$ are simultaneously removed.

The air supply is choked by substantially reducing the flow rate through inlet 36. The reduction of gas input may vary from a flow rate reduction of about one-half to almost a complete reduction of the normal gas flow. The gas flow rate must certainly be choked to a rate less than 5 cu. cm. of oxygen ($O_2$) per min. for each sq. cm. of electrode area. For metal-gas batteries, especially those having iron or zinc anodes, and rather fragile carbon-polytetrafluoroethylene cathodes, it is advisable not to reduce the gas flow rate below 0.01 cu. cm. per min., to eliminate the possibility of hydrogen gas bubbling at the cathode which may harm its structure. The choking period for this system must be greater than about 2 minutes and preferably from 5 to 60 minutes.

In order to activate the cathode, the potential of the cathode must be decreased substantially below normal operating ranges. However, the large polarization (voltage drop) and the concomitant larger current at normal gas flow rates produce a considerable amount of heat in the electrode that tends to disrupt the pore structure and promote electrolyte flooding through to the gas side of the electrode. Applicant in this method cathodically activates at a substantially lower than normal supply of air. This produces a more cathodic (negative) potential at a low current thus avoiding the effects of overheating. The cathodic potential must be reduced below the normal operating range of the cell. This will be below about −0.3 volts as measured against a Hg/HgO reference electrode or below about +0.6 volts as measured against a reversible hydrogen electrode in the same electrolyte. The preferred cathodic potential range applied to the gas diffusion electrode for activation is from about −0.60 to −0.93 volts as measured against a mercury-mercuric oxide reference electrode, or from about +0.3 to 0 volts as measured against a reversible hydrogen reference electrode in the same electrolyte.

Figure 2:
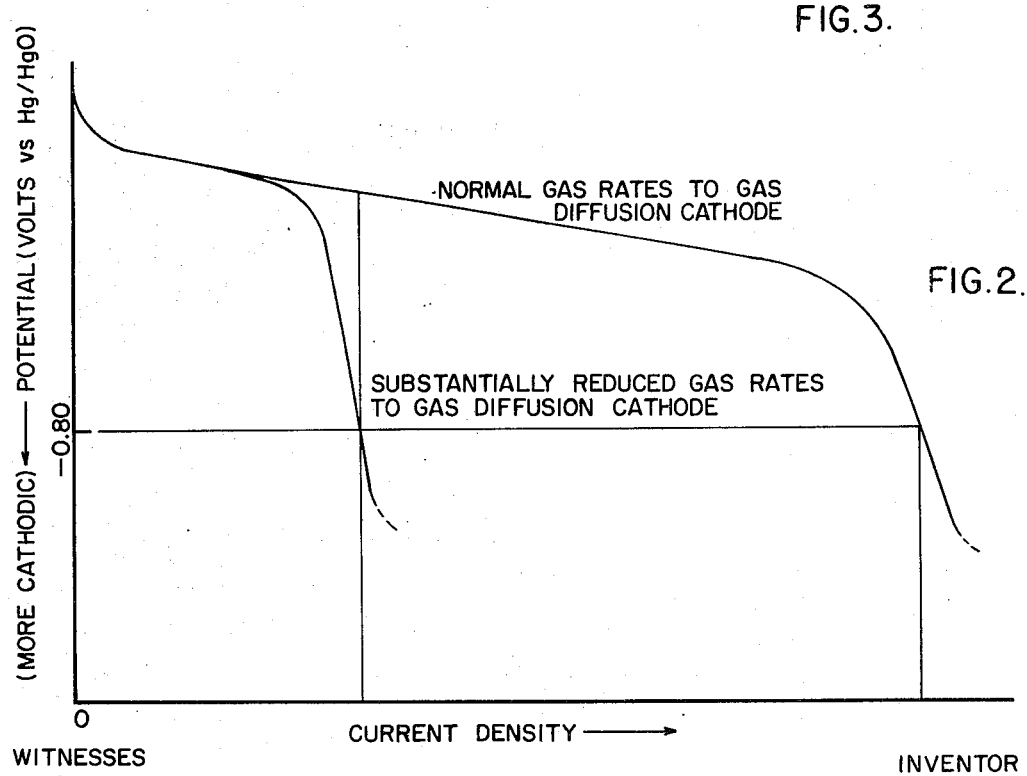
FIG. 2 is a graph showing potential vs. current density at different gas rates.

In order to avoid the high current obtained at the decreased cathodic potential used in activation, the air supply is reduced to such an extend that the current must fall below the value obtained at high gas flow rates at the same potential. Gas flow and current are related by the fact that the voltage will start to drop substantially when the current uses up a major portion of the oxygen. To have a current of 1 ampere, the supply of oxygen must be kept larger than 3.4 cu. cm./min. (17 cu. cm. of air/min.) at standard temperature and pressure. The upper limit to the current is the one obtained by the normal current-voltage characteristic when the air flow is chosen high enough so that no further power is gained by increasing it. It is the essence of this invention to keep the power below this level by a reduction of the normal oxygen supply. FIG. 2 shows in graphical form how the voltage can be made more cathodic (i.e., decreased or made more negative) at low current densities by reducing the gas flow to the gas diffusion cathode.

The preferred gas diffusion electrode is that taught by Sandler and Durigon in U.S. Ser. No. 776,636, filed Nov. 18, 1968, now abandoned and assigned to the assignee of this invention.

The gas electrode 10, in FIG. 1, usually comprises a porous conductor such as wire mesh, perforated metal sheet or a compressed metal wool member, preferably composed of nickel, that is either unplated or plated with a noble metal when used as an air electrode. This is bonded to a porous electrode body generally comprising a finely divided metal in the form of a particulate black or other carbonaceous material that is inert to the electrolyte, such as carbon, graphite, boron carbide or their mixtures. These materials are generally held together by a resinous hydrophobic hydrocarbon or halogenated hydrocarbon binder that is inert to the electrolyte. A particularly suitable binder is polytetrafluoroethylene which may also be used for a barrier to electrolyte penetration through the electrode to the gas side.

In addition a filler such as fibrous potassium titanate may be added to improve the mechanical strength or diffusion characteristics of the electrode. A catalyst, such as at least one of the metals or iridium, ruthenium, rhodium, palladium, platinum, gold, silver, titanium or their mixtures with oxides such as cobalt oxide, manganese oxide or mixed oxides of the spinel structure, is generally added to the porous electrode body in an amount varying from about 0.1 to 10 milligrams of active catalyst per square cm. of geometric electrode area.

Figure 3:
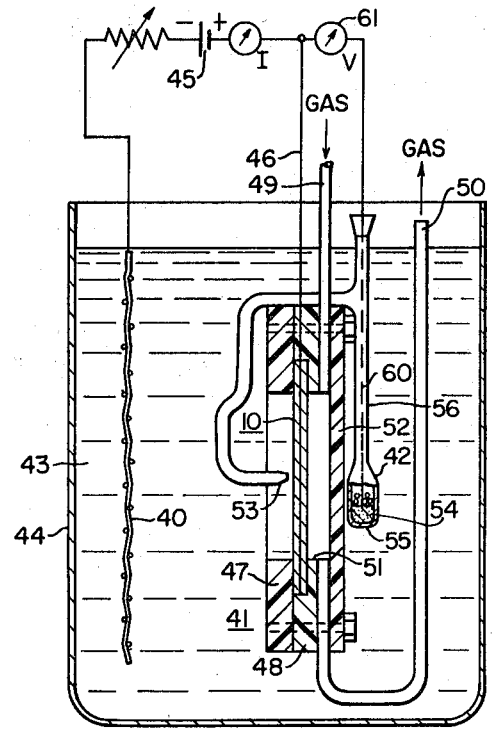
FIG. 3 shows an electrode activating and testing device.

The electrode 10 was activated and tested against an inert counter electrode 40 in a driven circuit, such as shown in FIG. 3. It was placed in an electrode holder 41, in conjunction with a reference electrode 42.

As shown in FIG. 3, the assembly of the electrode holder 41 and the electrode 10 is immersed in an electrolyte 43, such as aqueous KOH, contained in a container 44. A counter electrode 40, composed of a metal mesh such as platinum or nickel, is likewise immersed in the electrolyte 43. The cell including the electrodes 10 and 40 in the electrolyte 43 is driven by a 12 volt battery 45 for testing with the electrode 10 connected to the circuit by a lead wire 46, which extends between the interfaces of the frame member 47 and the portions 48, and which is connected to the upper end of the grid conductor which runs through the electrode 10.

The electrode holder 41 is provided with an inlet tube 49 and an outlet tube 50 which communicate with the portion of the opening 51 between the plate portion 52 and the electrode 10, whereby the active gas such as oxygen is in contact with the catalyst within the electrode 10.

The reference electrode 42 is used in conjunction with a Luggin capillary having an opening 53 which is located about 2 mm. from the surface of the electrode 10, in order to measure the potential of the electrode against a point in the electrolyte located as closely as possible to the electrode 10. The electrode 42 includes a mercury/mercury oxide mixture 54 located in a glass bulb 55 that communicated via an inverted U-shaped glass tube 56 with the Luggin capillary opening 53 on the electrolyte side of the electrode 10. The tube 56 is filled with electroylte 43. The tube 56 is U-shaped to facillitate attachment of the electrode 42 and the electrode holder 41. A platinum wire 60 leads from the Hg/HgO mixture 54 to one side of a high impedance, voltmeter 61, the other side of which is connected to the electrode 10. When air is used as an active gas and the electrolyte is alkaline (KOH), the air before entering the device is preferably scrubbed by passing it through an alkaline solution. This removes the carbon dioxide and other impurities such as $SO_2$ from the air. The gas flow during activation at a constant current density should not be reduced below about 0.01 cu. cm./min for each sq. cm. of gas cathode area. Complete termination can be especially disadvantageous with certain anodes and can harm the structure of fragile gas diffusion electrodes. During activation the choking period must be greater than about 2 minutes and preferably from 5 to 60 minutes.

The following examples illustrate the practice of the invention.

EXAMPLE 1

A circular air diffusion electrode was prepared having a total area of 20 square centimeters and a thickness of about 12 mils. A mixture of 175 mg of a conducting acetylene carbon black (supplied by Shawinigan Products Corporation) and polytetrafluoroethylene emulsion was mixed with sufficient water to form a stiff paste which was spread over one side of an expanded nickel mesh electrical conductor that was silver plated. The mesh was about 5 mils thick and had openings of about 5 sq. mm. The emulsion contained about 25 mg. of finely divided polytetrafluoroethylene (sold under the trade name Teflon 30 TFE Emulsion by E.I. DuPont). Excess moisture was removed by placing a sheet of porous polyvinyl chloride (PVC) immediately under the nickel mesh and a sheet of filter paper under the sheet of PVC.

The mesh and layer of Teflon bonded carbon was then inverted. The sheets of PVC and filter were removed from the mesh. A catalyzed layer was then applied to the mesh. This layer was composed of a mixture of 80 mg of a conducting acetylene carbon black and an aqueous emulsion of Teflon 30 TFE containing 35 mg. of finely divided polytetrafluoroethylene. To the mixture was added a mixed catalyst of cobaltous oxide and ferric oxide dispersed on the carbon in the amount of 1 mg. catalyst per sq. cm. of geometric electrode surface area. The electrode was then slowly heated to about 350°C in a furnace and hot pressed under a 2,000 lb. load at 280°C.

The electrode was activated and tested in the "driven" cell, shown in FIG. 3 of the drawings and described in the specification, containing 30 weight percent aqueous KOH solution. The cell was "driven" by a 12 volt battery and a variable resistor so as to give approximately constant current for a given resistance setting. It was operated at room temperature (about 25°C) in scrubbed air ($CO_2$ and $SO_2$ free) at a constant cathodic current density of 100mA/sq. cm., and the potential of the air electrode was measured against a mercury-mercuric oxide reference electrode in the same electrolyte. The exposed geometric gas diffusion electrode area was 11 sq. cm. A platinum not served as a counter electrode.

The potential, 35 minutes after immersion of the air electrode in the electrolyte and applying the current was −0.345 volts. The air supply was then choked from a normal flow rate of about 150 cu. cm/min. to about 20 cu. cm/min., for 5 minutes so as to obtain a reduced (more negative) potential of −0.9 volts at the same current. This provided a gas flow of 1.8 cm³/min per cm² exposed area.

After again supplying normal air flow the potential immediately rose to −0.235 volts (no corrections are applied for the ohmic drop in the electrolyte). It remained at this value to the next day when the air supply was again choked for 35 minutes. Under normal air supply the potential rose to a final value of −0.195 volts. This demonstrates how cathodic activation by choking the air supply instead of increasing the current, can markedly increase overall terminal voltage of the gas electrode by activating the catalytic and/or carbon componets of the gas electrode.

EXAMPLE 2

An electrode was prepared similar to that of Example 1 except that between ½ to 1 mg./sq. cm. of silver catalyst was dispersed on the carbon in the form of silver nitrate. In the course of the manufacture, the electrode was pressed and heated in air at 350°C in a furnace but hydrogen gas was not used to completely reduce the salt to the metal catalytic form.

The electrode was activated and tested in the "driven" cell, shown in FIG. 3 of the drawings and described in the specification, containing 30 weight percent aqueous KOH solution. It was operated at room temperature in scrubbed air ($CO_2$ and $SO_2$ free) at a constant cathodic current density of 100 mA/sq. cm., and the potential of the air electrode was measured against a mercury-mercuric oxide reference electrode in the same electrolyte (30 percent KOH).

The potential, 17 minutes after immersion of the air electrode in the electrolyte and application of the current was −0.43 volts. The air supply was then choked from a normal flow rate of about 150 cu. cm./min. to about 20 cu. cm./min. for 15 minutes so as to give a potential of −0.9 volts at the same current. This provided a gas flow of 1.8 cm³/min. per cm² exposed area.

After again supplying a sufficient air flow, the potential immediately rose to −0.14 volts (not corrections are applied for the ohmic drop in the electrolyte). The potential in 4 days gradually decayed to −0.25 volts at which potential it stayed constant for the next 4 days. On the 8 day the air supply was again choked for 15 minutes to activate the electrode. The potential at normal air flow subsequently rose to −0.16 volts. This example demonstrates the principle of reactivation of the electrode and also how my method can eliminate the necessity in some cases of hydrogen reduction of metal salts to their respective metal catalysts in gas diffusion electrode manufacture. Subsequently these electrodes can be used in batteries.

EXAMPLE 3

An electrode was prepared similar to that of Example 1 except that the nickel mesh electrical conductor was gold plated and the catalyst in this case was 2.5 mg./sq. cm. of platinum. It was dispersed on the carbon in the form of chloroplatinic acid. In the course of the manufacture, the electrode was pressed and heated in air at 350°C in a furnace, but hydrogen gas was not used for complete reduction of the platinum chloride.

The electrode was activated and tested in the "driven" cell, shown in FIG. 3 of the drawings and described in the specification, containing 30 weight percent aqueous KOH solution. It was operated at room temperature in pure $O_2$ at a constant cathodic current density of 100 mA/sq. cm. and the potential of the $O_2$ electrode was measured against a mercury-mercuric oxide reference electrode in the same electolyte (30 percent KOH).

The potential, 5 minutes after immersion of the oxygen electrode in the electrolyte and application of the current was −0.125 volts. The $O_2$ supply was then choked from a normal flow rate of about 30 cu. cm/min. to about 4 cu. cm/min. (for 11 sq. cm. of exposed electrodes area) for 10 minutes, to give a potential of −0.09 volts at the same current. This provided a gas flow of 0.36 cm³/min. per cm² exposed area.

After again supplying a sufficient oxygen flow, the potential immediately rose to −0.04 volts (no corrections are applied for the ohmic drop in the electrolyte).

EXAMPLE 4

An electrode was prepared similar to that of Example 1, except that the catalyst was 1 mg./sq. cm. of silver dispersed on the carbon. It was applied in the form of silver nitrate. The total electrode area was 20 square centimeters with an exposed geometric area of 11 sq. cm.

The electrode was tested at room temperature in the "driven" cell shown in FIG. 3 of the drawings which was modified by inclusion of a potentiostat (a potential control device) which was designated to keep the voltage constant at −0.8 volts between the gas diffusion electrode and the mercury-mercuric oxide reference electrode even though the current density might vary. The cell contained 30 weight percent aqueous KOH and was operated in scrubbed air ($CO_2$ and $SO_2$ free).

The potential, 24 hours after immersion of the air electrode in the electrolyte and application of 100 mA/sq. cm. current was −0.198 volts. The air supply was then choked from a normal flow rate of about 150 cu. cm./min. to about 4 cu. cm./min. for 30 minutes. This provided a gas flow of 0.36 cm³/min. per cm² exposed area. The potential was held to −0.8 volts. The indicated current now was only about 220 mA, i.e., 20 mA/sq. cm. with 11 sq. cm. of effective electrode area. After again supplying normal air flow, the potential immediately rose to −0.14 volts (no corrections are applied for the ohmic drop in the electrolyte).

The air supply was then again choked, for 10 minutes at 20 mA/sq. cm. current density. The potential was held to −0.8 volts. After again supplying normal air flow the potential immediately rose to −0.13 volts. The air supply was then choked to about 11 cu. cm./min. for 10 minutes at a potential of −0.8 volts to now give a current density of 55 mA/sq. cm. The potential rose to the prior value (−0.13 volts) after again supplying a normal air flow rate and a current density of 100 mA/sq. cm.

This demonstrates that the application of reduced cathodic potential in the range of about −0.6 to −0.9 volts as measured against a Hg/HgO reference electrode, is effective during cathodic activation, and not the heat dissipated in the electrode due to high current, to give the improved output after restoring normal operating conditions.

EXAMPLE 5

A metal-air battery similar to that shown in FIG. 1 of the drawings and described in the specification was constructed. It consisted however of two iron-air cells shunted electrically in series. Each iron electrode consisted of a metal fiber grid that had been filled with iron particles that were treated with hydrogen sulfide. The electrode had been "formed" by repeated charge and discharge against a nickel electrode in a driven cell.

The air diffusion electrode was made similar to that of Example 1 except that it had an effective exposed geometric area of 29 square centimeters. One layer of the air electrode contained 14 mg. of conducting acetylene carbon black and 2 mg. of polytetrafluoroethylene (from Teflon 30 TFE Emulsion) for each sq. cm. of electrode area. The catalyzed layer on the opposite side of the mesh contained 6.4 mg. of conducting acetylene carbon black, 2.8 mg. of polytetrafluoroethylene (from Teflon 30 TFE Emulsion) and 1 mg. of silver catalyst from silver nitrate for each sq. cm. of electrode area. The electrode was slowly heated to about 350°C in a furnace and hot pressed at a 100 lb./sq. cm. load at 280°C.

The metal-air battery consisted of two cells and 30 weight KOH KPH electrolyte. After charging the battery by charging the iron electrodes against the auxiliary charging electrode, scrubbed air was fed into the battery at a rate of about 150 cu. cm. per min. The two cells in series was discharged over a variable resistive load shown as 38 in FIG. 1, to give a current of 1.8 ampere (62 mA/sq. cm) at 0.45 volts for each cell (0.9 volts total).

For cathodic activation, the resistive load was removed and resistors of 3 ohms shown as 39 in FIG. 1 were put between the air electrode and the iron electrode of each cell. The air supply was choked to about 0.6 cu. cm. per min. for 10 minutes so as to give a low current of only 0.03 amps. This provided a gas flow of 0.02 cm³/min. per cm² exposed area. The air electrode potentials were about 0.09 volts (0.03 amps. x 3 ohms) above that of the iron electrodes. The iron electrodes were measured to be at about −0.9 volts using a mercury-mercuric oxide reference electrode so that the air electrodes during activation were at about −0.8 volts as measured against a Hg/HgO reference electrode.

After 10 minutes the normal air flow (about 150 cu. cm. per min.) was restored, the 3 ohm resistors were removed and the previous resistive load was reconnected. The output voltage at 1.8 amps. had gone up to 0.56 volts per cell from 0.45 volts per cell, thus showing the effect of cathodic activation at low air supply and low current density. The use of a gas flow below about 0.01 cm³/min in the iron-air system and especially complete choking of the gas flow could at higher currents cause hydrogen bubbling and disruption and damage to the gas diffusion electrode. Generally to provide adequate activation the choking should last at least about 2 minutes and will preferably be continued for about 5 to 60 minutes, initially or periodically during operation of the battery.

I claim as my invention:

1. A method of operating a metal-gas battery having a gas diffusion electrode comprising a coherent porous body containing an electrical conductor, particles of a carbonaceous conducting material, a resinous binder and a catalyst by operating the gas diffusion electrode as a cathode in a cell also containing an oxidizable metal anode and electrolyte whereby a gas selected from the group consisting of air and $O_2$ is fed into the gas diffusion electrode with electrolyte permeating the opposite side, said cell being used for causing current to flow externally through a load circuit connecting the anode and cathode; the method characterized by making the potential of the gas diffusion electrode more cathodic than at the normal operating range by reducing the rate of gas fed into the gas diffusion electrode to less than 5 cu. cm. per min. but greater than 0.01 cu. cm. per min. for each sq. cm. of exposed gas diffusion electrode area, at least once for a period of time greater than about 2 minutes, said reduction of gas decreasing the cathodic potential to a value below +0.6 volts as measured against a reversible hydrogen reference electrode in the same electrolyte.

2. The method of claim 1 wherein the carbonaceous material is selected from the group consisting of carbon, graphite, boron carbide and mixtures thereof, the catalyst is selected from the group consisting of at least one of the metals of iridium, ruthenium, rhodium, palladium, platinum, gold, silver and titanium and characterized by reducing the gas rate for a period of time between 2 and 60 minutes.

3. The method of claim 1 wherein the electrolyte is selected from the group consisting of aqueous NaOH and KOH, the gas is air which is passed through an alkaline absorbent before being fed into the gas diffusion electrode.

4. A method of operating a metal-gas battery having an anode, an electrolyte, and a cathode; said anode comprising an oxidizable metal selected from the group consisting of iron, cadmium, and zinc, said cathode being a gas diffusion electrode comprising a coherent porous body containing an electrical conductor, particles of conducting material selected from the group consisting of carbon, graphite, boron carbide and mixtures thereof, a halogenated hydrocarbon binder inert to the electrolyte and a catalyst, and having a gas entrance side wherein a gas selected from the group consisting of air and $O_2$ is fed into the gas diffusion electrode with electrolyte permeating the opposite side, said cell being used for causing current to flow externally through a load circuit connecting the anode and cathode; the method characterized by making the potential of the gas diffusion electrode more cathodic than at the normal operating range by reducing the rate of gas fed into the gas diffusion electrode to less than 5 cu. cm. per min. but greater than 0.01 cu. cm. per min. for each sq. cm. of exposed gas diffusion electrode area at least once for a period of time greater than about two minutes, said reduction of gas decreasing the cathodic potential to a value below +0.6 volts as measured against a reversible hydrogen reference electrode in the same electrolyte.

5. The method of claim 4 wherein the catalyst is selected from the group consisting of at least one of the metals of iridium, ruthenium, rhodium, palladium, platinum, gold, silver and titanium and characterized by reducing the gas rate for a period of time between 2 and 60 minutes.

6. The method of claim 5 wherein the electrolyte is selected from the group consisting of aqueous NaOH and KOH, the halogenated hydrocarbon binder is polytetrafluoroethylene, the gas is air which is passed through an alkaline absorbent before being fed into the gas diffusion electrode.

* * * * *